(12) United States Patent
Allison

(10) Patent No.: US 6,720,008 B2
(45) Date of Patent: Apr. 13, 2004

(54) COMPOSITION AND METHOD FOR THE ENCAPSULATION OF WATER-SOLUBLE MOLECULES INTO NANOPARTICLES

(75) Inventor: Stewart Dean Allison, Denver, CO (US)

(73) Assignee: PR Pharmaceuticals, Inc., Fort Collins, CO (US)

( * ) Notice: Subject to any disclaimer, the term of this patent is extended or adjusted under 35 U.S.C. 154(b) by 163 days.

(21) Appl. No.: 10/055,720

(22) Filed: Jan. 22, 2002

(65) Prior Publication Data
US 2003/0138557 A1 Jul. 24, 2003

(51) Int. Cl.[7] .......................... A61K 9/16; B32B 15/02; B01J 13/02
(52) U.S. Cl. .................. 424/491; 264/4.1; 264/4.3; 264/4.33; 428/402.21; 428/402.22; 428/403; 424/492; 524/801; 524/803
(58) Field of Search .................. 264/4.1, 4.3, 4.33; 428/402.21, 402.2, 403; 424/491, 492; 524/801, 803

(56) References Cited

U.S. PATENT DOCUMENTS

| | | | |
|---|---|---|---|
| 4,177,177 A | 12/1979 | Vanderhoff et al. | .... 260/2.92 M |
| 5,049,322 A | 9/1991 | Devissaguet et al. | ........ 264/4.1 |
| 5,118,528 A | 6/1992 | Fessi et al. | ............ 427/213.36 |
| 6,143,211 A | 11/2000 | Mathiowitz et al. | ........... 264/4 |

OTHER PUBLICATIONS

Danielsson, I. et al. "The Definition of Microemulsion" *Colloids and Surfaces* 3:391–392 (1981).
Israelachvili, J.N. et al. "Theory of Self–Assembly of Hydrocarbon Amphiphiles into Micelles and Bilayers" *J. Chem. Soc., Faraday Trans. II* 72:1525–1568 (1976).
Mitchell, D.J. et al. "Micelles, Vesicles and Microemulsions" *J. Chem. Soc., Faraday Trans.* 2 77:601–629 (1981).
Mosqueira, V.C.F. et al. "Poly(D,L–Lactide) Nanocapsules Prepared by a Solvent Displacement Process: Influence of the Composition on Physicochemical and Structural Properties" *Journal of Pharmaceutical Sciences* 89(5):614–626 (May 2000).
Niwa, T. et al. "In Vitro Drug Release Behavior of D,L–Lactide/Glycolide Copolymer (PLGA) Nanospheres with Nafarelin Acetate Prepared by a Novel Spontaneous Emulsification Solvent Diffusion Method" *Journal of Pharmaceutical Sciences* 83(5):727–732 (May 1994).
Prince, L.M. "Microemulsions Versus Micelles" *Journal of Colloid and Interface Science* 52(1):182–188 (July 1975).
Rafati, H. et al. "Protein–loaded poly(DL–lactide–co–glycolide) microparticles for oral administration: formulation, structural, and release characteristics" *Journal of Controlled Release* 43:89–102 (1997).

*Primary Examiner*—S. A. Acquah
(74) *Attorney, Agent, or Firm*—Jane E. Remillard, Esq.; Lahive & Cockfield LLP

(57) ABSTRACT

A method and composition for the encapsulation of hydrophilic molecules in submicron particles is disclosed. The particles are composed of a water-in-oil microemulsion surrounded by one or more biocompatible polymers.

34 Claims, 2 Drawing Sheets

Scanning electron micrograph of microemulsion nanoparticles containing eosin.

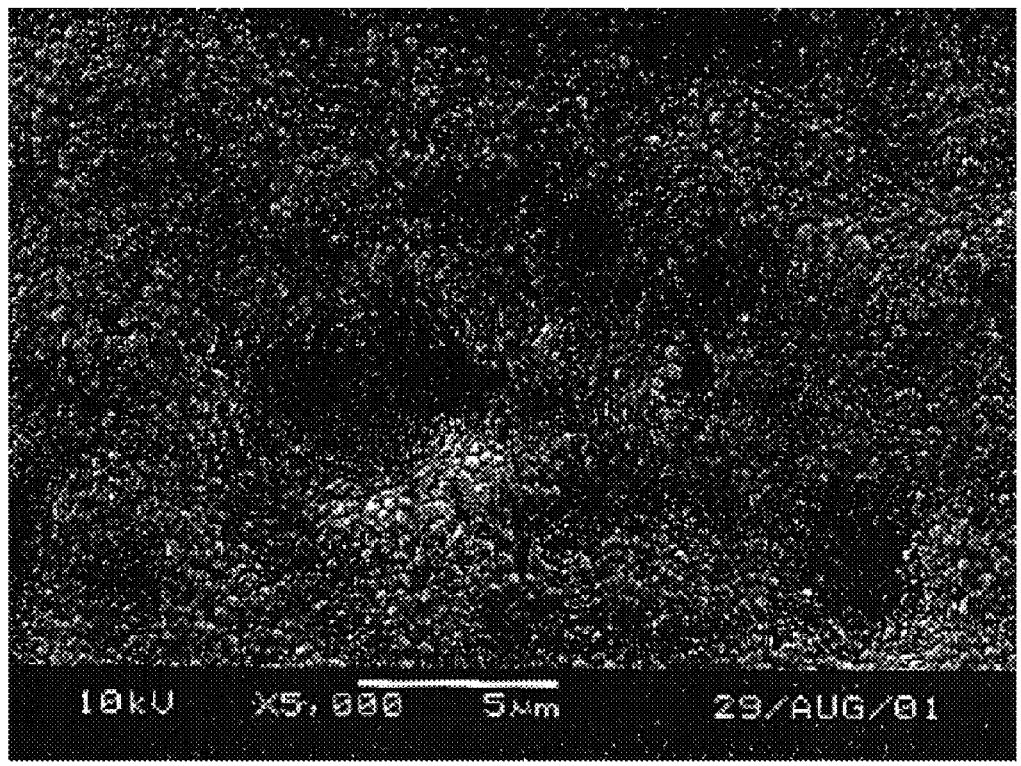
Figure 1. Scanning electron micrograph of microemulsion nanoparticles containing eosin.

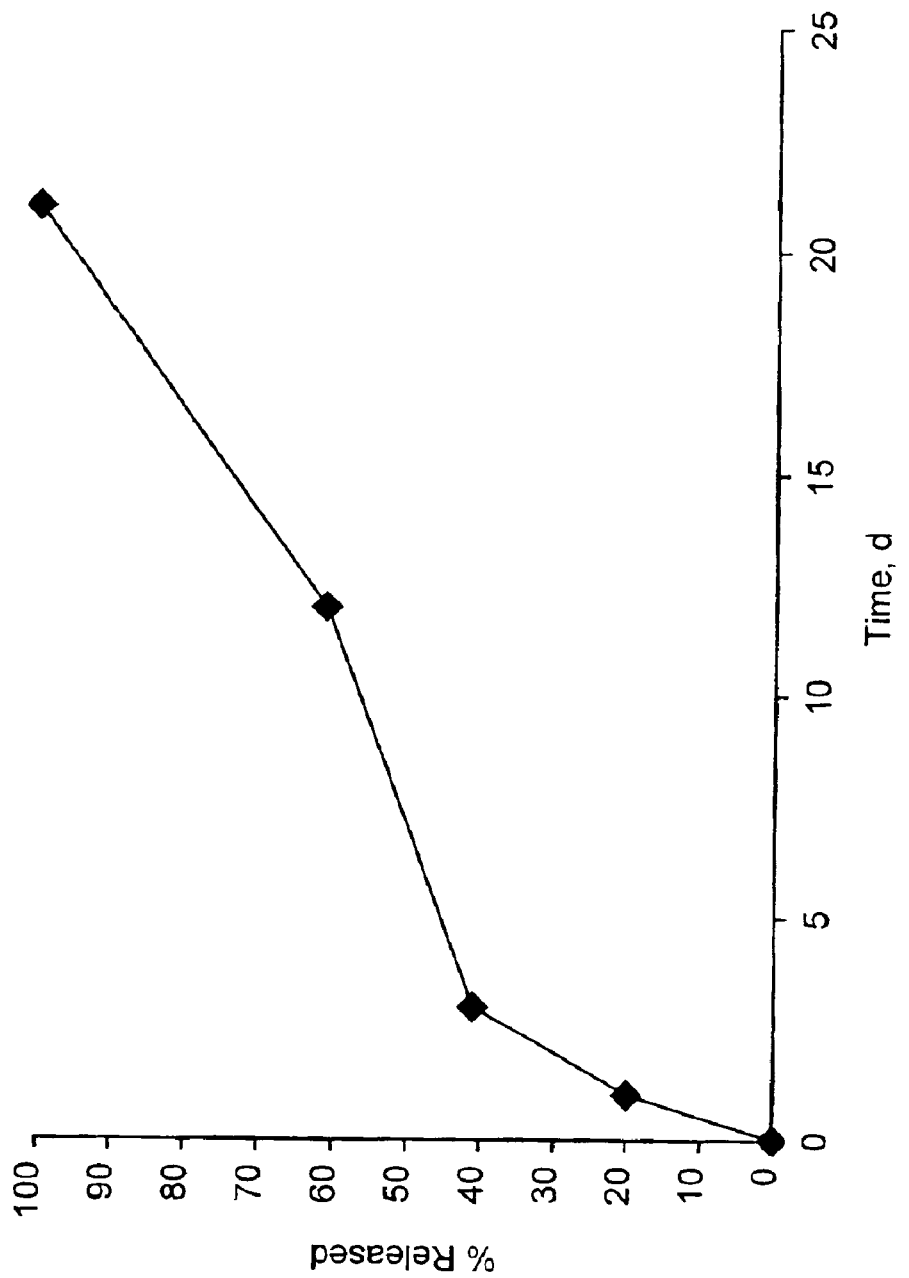
Figure 2. In vitro release of heparin from microemulsion nanoparticles.

COMPOSITION AND METHOD FOR THE ENCAPSULATION OF WATER-SOLUBLE MOLECULES INTO NANOPARTICLES

BACKGROUND OF THE INVENTION

Encapsulation of drugs into microparticles (e.g. nanoparticle and nanocapsule delivery systems) provides several advantages for in vivo drug delivery, including the ability to modify the drug's biodistribution and to increase its bioavailability. These advantages are particularly important for therapeutic polar (i.e., water-soluble) macromolecules, such as polypeptides, polysaccharides, and polynucleotides, which otherwise have poor bioavailability, particularly when administered orally. However, prior to the present invention, satisfactory techniques for encapsulating water-soluble drugs into submicron particles were unknown.

One important feature of microparticles is the protection they afford to drugs from acid and enzymatic hydrolysis in the gut. For example, once delivered to a subject, submicron particles may be taken up via the gut-associated lymphoid tissue (GALT), commonly known as Peyer's patches, into the lymphatic circulation. This route of uptake avoids hepatic first-pass metabolism and permits a therapeutic drug level to be achieved using a smaller dose, since metabolic systems need not be saturated. Moreover, intramuscularly or subcutaneously injected submicron particles are also capable of entering the lymphatic system and thus can circulate throughout the body. The material properties of the submicron particle wall or matrix also can be tailored to allow programmed release of the drug, thereby further improving the drug's biodistribution and bioavailability.

The polymers used to form the matrices or capsule walls of microparticles are typically not water-soluble and therefore are not miscible with water-soluble drugs. Accordingly, the water/oil/water (w/o/w) double emulsion process has typically been used to encapsulate hydrophilic drug molecules into microparticles. This process involves the dispersion of an aqueous solution containing drug into an organic phase containing a preformed polymer in solution. The primary water/oil (w/o) emulsion is in turn dispersed into a second aqueous phase containing an emulsion stabilizer. This technique has been shown to efficiently encapsulate hydrophilic drugs, such as proteins, polynucleotides, or polysaccharides, with adequate core loads into particles larger than 1 $\mu$m. However, particles greater than 1 $\mu$m are taken up by the GALT far less efficiently than submicron particles. Therefore, the bioavailability of encapsulated molecules would be significantly higher if particles containing high drug loads could be manufactured in the submicron range.

Particle uptake via the GALT after oral delivery increases exponentially as particle size decreases from 5 $\mu$m into the submicron range. Similarly, in cases where it is desired that subcutaneously or intramuscularly injected particles circulate in tissues, particle size must be less than approximately 5 $\mu$m. However, the efficiency with which drug molecules can be encapsulated, particularly large, water-soluble molecules, decreases dramatically as particle diameter decreases below approximately 1 $\mu$m. Therefore, creating submicron particles capable of being taken up efficiently by the GALT or capable of circulating within tissues that also contain sufficient drug content to allow therapeutic drug concentrations to be achieved is one of the main challenges in the pharmaceutical industry.

In a typical encapsulation involving the coarse water/oil/water double emulsion technique, the internal aqueous phase is usually dispersed into oil at a volume ratio of 1:2 to 1:20 (w:o), with higher encapsulation efficiencies observed for lower ratios of water to oil. Particles as small as 1 to 3 $\mu$m in diameter may be generated using this technique. However, the size of the internal water droplets has a lower limit determined by the physical properties of the internal water and oil phases. The size of the internal water droplets in turn determines the efficiency with which drug may be encapsulated in particles in the submicron size range.

In addition, another problem associated with past techniques of forming submicron particles is that coarse emulsions typically formed to encapsulate water-soluble molecules in microparticles are not thermodynamically stable. Internal water droplets will tend to fuse and become larger if the particles are not quickly hardened. As one attempts to reduce the overall particle size, for example, by increasing mixing energy, and/or decreasing the viscosity of the primary emulsion, the encapsulation efficiency decreases due to increased opportunity for internal water droplets to diffuse to the outer surface of the oil phase and deposit the contents of the internal aqueous phase into the external aqueous medium. The end result of this thermodynamic instability of the internal w/o emulsion is that the proportion of drug associated with polymer becomes increasingly restricted to the surface of the particles which causes it to be quickly released (referred to as a "burst") from the nanoparticle after dosing, a result which is often contrary to the intended release profile. In the case of oral delivery in particular, significant quantities of drug may be released before the particles are taken up across the gut mucosa.

Other strategies have been attempted to efficiently encapsulate water-soluble molecules into submicron particles. For example, naturally occurring hydrophilic polymers, such as albumin or gelatin, have been used to generate matrix-type nanoparticles. However, while hydrophilic polymers are compatible with water-soluble drugs and therefore have the potential for high loads and high encapsulation efficiencies, the hydrophilic surfaces of these particles are less likely to be taken up via the GALT than are particles of similar size with hydrophobic surfaces. Moreover, extensive processing is often required to remove toxic chemical crosslinking agents used to harden the particles. Heat denaturation has also been used to form hardened particles with the problem that heat often destroys the bioactivity of encapsulated drugs.

Methods for encapsulating drugs into microparticles composed of preformed polymers, such as the spontaneous emulsification process, have also been described (see e.g., U.S. Pat. No. 5,118,528). However, while submicron particles with uniform size distributions have been formed using this technique, it has been shown that large, water-soluble drugs are not efficiently encapsulated and high burst release characteristics are common (Niwa et al. (1994) J. Pharm. Sci. 83:727). Another drawback to the technique is that only limited volumes of aqueous drug solutions can be added to the polymer solution without affecting polymer solubility when hydrophobic polymers are used. Furthermore, low molecular weight polymers with a higher polar character than polylactic acid tend to precipitate without encapsulating, rather than form nanoparticles.

U.S. Pat. No. 5,049,322 describes a modified technique for the production of nanocapsules using preformed polymers. In this technique, an oil, a solid suspension, or volatile organic solution containing drug is dispersed into a water-miscible organic solvent, usually acetone, containing a solution of polymer. A polymer wall is deposited around solid particles or oil droplets when the oil phase is poured into a second continuous, usually aqueous phase that is a nonsolvent for the polymer. However, this patent describes a system for the encapsulation of material compatible with oils or organic solvents rather than aqueous solutions.

Other nanoparticle encapsulation techniques, such as the phase inversion method described in U.S. Pat. No. 6,143,211, require that the hydrophilic drug molecule be in a micronized, solid form and be suspended, rather than dissolved, in the organic phase. This has the disadvantage that dehydration of certain classes of water-soluble molecules, such as proteins, in addition to requiring expensive material processing steps, often results in irreversible structural and functional damage. Furthermore, dissolution of encapsulated material in tissue fluids may be incomplete, or, in the case of proteins, may form immunogenic aggregates.

Accordingly, improved techniques for efficiently encapsulating hydrophilic (water-soluble) drugs into microparticles, particularly submicron particles, at core loads that result in pharmacological activity, particularly after oral delivery, would be of great benefit.

SUMMARY OF THE INVENTION

The present invention provides an improved method and composition for encapsulating a wide variety of water-soluble agents into microparticles, including submicron particles (e.g., nanoparticles or particles having a size of less than about 1000 nanometers), capable of effectively delivering such agents in vivo, particularly when administered to subjects orally. The method involves forming a microemulsion containing an aqueous drug solution solubilized in oil, and subsequently encapsulating the microemulsion in a polymer shell. The resulting microparticles contain high drug core loads with minimal surface adsorbed drug, thereby reducing any burst effect.

While the method of the present invention has particular advantages for the encapsulation of water-soluble molecules into submicron particles, the method also can be used to form microparticles of larger size. This may be preferable, for example, in instances where delivery of water-soluble agents from a non-circulating injected depot is desired.

Accordingly, in one embodiment, the present invention provides a method for encapsulating a water-soluble agent by (a) forming a microemulsion comprising the agent; (b) adding the microemulsion to a first solvent comprising one or more polymers, thereby forming a dispersion; and then (c) adding the dispersion to a second solvent which is a nonsolvent for one or more polymers, resulting in encapsulation of the microemulsion by the one or more polymers in the form of microparticles.

In a particular embodiment, the drug-containing microemulsion formed in the invention comprises about 10% to 60% oil by volume. The microemulsion can further contain one or more surfactants or co-surfactants. Suitable surfactants include, but are not limited to polyoxyethylene sorbitan monooleate alone, sorbitan monolaurate, and mixtures thereof. Suitable co-surfactants include but are not limited to short to medium chain alkyl- or branched chain alcohols, such as ethanol, propanol, isopropanol, butanol, isobutanol, pentanol and isopentanol.

Typically, the microemulsion is added to the first solvent containing a polymer at a concentration of about 0.01% to 30% (w/w), more preferably about 0.1% to 10% (w/w). Suitable polymers include, for example, organic polymers such as polyvinyl alcohols, polyvinyl ethers, polyamides, polyvinyl esters, polyvinylpyrrolidone, polyglycolides, polyurethanes, alkyl celluloses, cellulose esters, hydroxypropyl derivatives of celluloses and cellulose esters, preformed polymers of poly alkyl acrylates, polyethylene, polystyrene, polyactic acid, polyglycolic acid, poly(lactide-co-glycolide), polycaprolactones, polybutyric acids, polyvaleric acid and copolymers thereof, alginates, chitosans, gelatin, albumin, zein and combinations thereof. A preferred polymer is poly(lactide-co-glycolide). Accordingly, the first solvent can be any suitable solvent for such polymers including, for example, ethyl acetate, benzyl alcohol and propylene carbonate.

In contrast to the first solvent, the second solvent is a nonsolvent for the selected polymer(s). A preferred second solvent is water. The second solvent can further include one or more emulsifying agents or surfactants to improve the formation of the microparticles upon addition of the microemulsion-containing dispersion.

Microparticles are then formed by adding the dispersion to the second solvent. The microparticles are typically in the submicron size range and are composed of a microemulsion containing a water-soluble agent encapsulated by one or more polymers.

A wide variety of water-soluble therapeutic agents, such as proteins, peptides, nucleic acids and other polar drugs, can be encapsulated using the method and composition of the present invention. Moreover, the resulting microparticles can be effectively administered to subjects using a variety of techniques, including parental (e.g., injection), topical and oral administration. Thus, the present invention is broadly applicable to many in vivo drug therapies.

BRIEF DESCRIPTION OF THE DRAWINGS

FIG. 1 shows heparin-containing nanoparticles prepared in accordance with the present invention.

FIG. 2 is a graph showing the in vitro release rate of heparin from nanoparticles prepared in accordance with the present invention.

DETAILED DESCRIPTION OF THE INVENTION

The present invention provides improved methods and compositions for drug delivery by enabling the encapsulation of water-soluble agents (e.g., drugs) by polymers in the form of microparticles, including submicron particles. This is achieved by forming a microemulsion containing the agent, followed by encapsulation of the microemulsion.

I. Microemulsion Formation

As used herein, the term "microparticle" is defined generally as particles that are less than about 1000 micrometers ($\mu$m) in size (e.g. are about 800 $\mu$m, 600 $\mu$m, 400 $\mu$m, 200 $\mu$m or less in size). Microparticles also include submicron particles, which are typically less than about 1000 nanometers (nm) in size (e.g. are about 800 mn–200 mn, more preferably about 600 nm–200 nm or less in size) and which are capable of effectively delivering water-soluble agents in vivo.

As used herein, the term "microemulsion" refers to a system of water, oil, and amphiphile which is a single optically isotropic and thermodynamically stable liquid solution (Danielsson and Lindman (1981) Colloids Surfaces 3:391–392). The term "microemulsion" does not imply or require any particular microstructure (e.g., involving a definite boundary between oil and water phases). In addition, for purposes of the present invention, a microemulsion includes systems that are co-solvents, i.e. systems in which components may be molecularly dispersed. For example, the microemulsion may be a strict water in oil microemulsion, a bicontinuous monophase, a micellar solution, or swollen micellar solution.

As used herein, the term "agent" refers to any water-soluble solute including, but not limited to, proteins, peptides, polysaccharides, nucleic acids or other biologically active compounds for administration to a subject, such as a human, animal or other mammal. While selected based upon the intended application or therapy, the agent is typically a therapeutic water-soluble drug, the efficacy of which can be improved or optimized when administered orally with a programmable, extended release pharmacokinetic profile, as is accorded by the present invention.

Suitable therapeutic proteins for use in the present invention include, for example, interferon-alphas, interferon-betas, interferon-γ, erythropoetins, granulocyte colony stimulating factor (G-CSF), granulocyte-macrophage colony stimulating factor (GM-CSF), interleukins, asparaginase, adenosine deaminase and insulin, to name but a few.

Suitable therapeutic peptides for use in the present invention include, for example, hormones such as adrenocorticotropin (ACTH), glucagon, somatostatin, somatotropin, thymosin, parathyroid hormone, pigmentary hormones, somatomedin, lutenizing hormone, chorionic gonadotropin, hypothalmic releasing factors, antidiuretic hormones, thyroid stimulating hormone, endorphins, enkephalins, biphalin and prolactin.

Additional suitable proteins include monoclonal and polyclonal antibodies, single-chain antibodies, other antibody fragments, analogs and derivatives thereof. Polynucleotides, including antisense oligonucleotides, aptamers and therapeutic genes can also be delivered using the methods and compositions of the present invention.

Anticoagulants, such as heparin and low molecular weight heparin, also can be delivered using the methods and compositions of the invention. Still other suitable therapeutic agents for use in the present invention include small bioactive molecules, such as anticancer drugs, e.g., doxorubicin and daunorubicin, vincristine, cisplatin, carboplatin, camptothecin and camptothecin analogs, antibiotics, antipsychotics, antidepressants, and small molecule drugs for diabetes and cardiovascular disease.

Typically, the molecular weight of the encapsulated water-soluble agent used in the present invention is about 10,000,000 daltons or less. Specific examples include for example, but are not limited to, eosin at 624 daltons, heparin at 25,000 daltons and DNA plasmids at about 10,000,000 daltons. However, incorporation of a water-soluble agent into a microemulsion should not be limited by molecular weight.

Many thermodynamically stable water-oil-surfactant-co-surfactant microemulsion systems exist that can solubilize significant quantities of water or aqueous solutions, and thus can be used in the present invention. Preferred microemulsion components are orally or parenterally biocompatible. For example, suitable oils for use in forming the microemulsion include, but are not limited to, vegetable oils, purified synthetic or natural triglycerides, phospholipids and their derivatives, such as lecithin or lysolecithin, alone or in mixtures with other oils. These oils are preferred to hydrocarbons, although microemulsions employing hydrocarbon oils, such as the n-decane through n-octadecane series, are also within the scope of the invention.

Other organic liquids including, but not limited to, benzene, tetrahydrofuran, and n-methyl pyrrolidone, or halogenated hydrocarbons, such as methylene chloride, or chloroform may also be used as the oil component of the microemulsion. In a particularly preferred embodiment of the invention, fatty acid esters, for example, isopropyl myristate or ethyl oleate, are used as the oil phase of the microemulsion. Each oil or unique mixture of oils may require a different surfactant or mixture of surfactants or surfactants and co-surfactants to solubilize water, as can routinely be determined by those of skill in the art. The proportion of oil or mixture of oils used in the microemulsion is typically in the range of between 10 and 60% by volume, most preferably between 20 and 50% by volume.

In general, the microemulsion also includes one or more surfactants or co-surfactants, as is well known in the art. Any surfactant may be used which, alone, or in combination with a co-surfactant, reduces the interfacial tension between oil and water components sufficiently (e.g., $<10^{-3}$ dyn/cm) to allow the spontaneous formation of a water in oil microemulsion. Examples include, but are not limited to, anionic surfactants such as fatty acid soaps, acyl sulfates, or acyl sulfosuccinates; cationic surfactants, such as alkyl primary, secondary, tertiary, or quaternary amines; nonionic surfactants, for example, sorbitan esters or polyethoxylated esters of acyl acids, copolymers of polyethylene oxide and polypropylene oxide. In a preferred embodiment of the invention, biocompatible surfactants, such as polyoxyethylene sorbitan monooleate, alone or in a mixture with sorbitan monolaurate are used to solubilize water in oil. The content of the surfactant or mixture of surfactants, apart from alcohols or other co-surfactants in the microemulsion, can range for example from between 0.1 to 60% by volume, more preferably from between 10 to 50%.

In accordance with the present invention, co-surfactants may also be used in microemulsion systems to increase interfacial pressure between water and oil phases. Microemulsion stability depends, in part, on the interaction between carbon chains of the oil, surfactant, and co-surfactant (BSO theory). Thus, for a given oil-surfactant system, water solubilization can be varied as the alcohol co-surfactant chain length is varied, as is well known in the art. In a preferred embodiment, the co-surfactant is an aliphatic alcohol, more preferably a primary aliphatic alcohol. Shorter chain alcohols, such as ethanol, are particularly preferred to more toxic, longer chain alcohols for use as co-surfactants. Alcohol content may range, for example, from about 0 to about 30% by volume in the microemulsion, more preferably from about 5 to about 20%.

Microemulsion formation from the above component categories proceeds spontaneously due to the favorable free energy of formation as the components are mixed together. Although microemulsions are thermodynamically favored, kinetic barriers may in some instances impede their formation. Accordingly, the application of moderate increases in mixing energy or temperature can be applied if necessary to overcome such kinetic barriers to the formation of the microemulsion, as is well known in the art.

II. Dispersion Formation

Following formation of the microemulsion containing the water-soluble agent, the microemulsion is added to a solvent (e.g., an organic solvent) containing one or more polymers, thereby forming a dispersion.

As used herein, the term "dispersion" refers to the distribution of particles throughout a medium, such as a solvent. The term "solvent" refers to any liquid substance that is capable of dissolving, dispersing, or suspending one or more other substances. Accordingly, suitable first solvents for use in the present invention include any solvent or mixture of solvents in which the polymer is soluble and in which the microemulsion can be dispersed. For example, suitable polymer solvents (i.e., for use as the first solvent) include, but are not limited to ethyl acetate, propylene carbonate, benzyl alcohol, acetonitrile and other organic solvents which are completely or partially miscible with the second solvent used in the invention.

As used herein, the term "polymer" includes any film forming polymer of natural, synthetic, or semi synthetic origin, and may be biodegradable or nonbiodegradable. Examples of suitable polymers include, but are not limited to, polyvinyl alcohols, polyvinyl ethers, polyamides, polyvinyl esters, polyvinylpyrrolidone, polyglycolides, polyurethanes, alkyl celluloses, cellulose esters, hydroxypropyl derivatives of celluloses and cellulose esters, preformed polymers of polyalkyl acrylates, polyethylene, polystyrene, polylactic acid, polyglycolic acid, polycaprolactones, polybutyric acid, polyvaleric acid and copolymers thereof, alginates, chitosans, gelatin, albumin, zein, alone, as physical mixtures, or as copolymers.

In a preferred embodiment, polyesters, such as poly (lactide-co-glycolide), are used to encapsulate the microemulsion. Such polyesters are typically in the molecular weight range of about 1,000 to 250,000 daltons, preferably from about 3,000 to 150,000 daltons. Moreover, the release rate of the resulting microparticles can be varied by the molecular weight and concentration of the polymer. This concentration typically ranges from about 0.01 to 30% (w/w), preferably from about 0.1 to 10% (W/W).

III. Microparticle Formation

Following addition of the microemulsion to the polymer-containing solvent (the first solvent), the resulting dispersion is then added to a second solvent which is a nonsolvent for the polymer, thereby forming microparticles which encapsulate the microemulsion.

As used herein, the term "nonsolvent" refers to a medium (e.g., liquid) in which a given compound is not soluble (e.g., capable of being dissolved and/or dispersed). For example, water is a nonsolvent for certain organic polymers which are not soluble in water. Accordingly, any solvent that is a nonsolvent for the polymer(s) employed in the present invention can be used as the second solvent.

The second solvent employed in the present invention can be completely or partially miscible with the first solvent, or non-miscible with the first solvent. Accordingly, in a particular embodiment, the second solvent is completely miscible with the first solvent. For example, the second solvent can be water and the first solvent can be acetone. In another particular embodiment of the invention, the second solvent is essentially completely nonmiscible with the first solvent. For example, the second solvent can be water and the first solvent can be chloroform.

In another particular embodiment of the invention, the first solvent is partially miscible in the second solvent so that the first solvent may be completely extracted from the discontinuous phase of the emulsion by the addition of a further quantity of the second solvent, or another solvent that is a nonsolvent for the polymer, and that will make up a continuous, external phase of sufficient quantity such that the first solvent is fully miscible upon addition of the further quantity of the second solvent, or mixture of polymer nonsolvents. For example, in this embodiment, the first solvent can be ethyl acetate, benzyl alcohol or propylene carbonate, and the second solvent can be water.

Emulsion stabilizers can also be added to the second solvent prior to addition of the dispersion-containing (internal phase-containing) first solvent. Suitable emulsifying agents are well known in the art and can include, for example, naturally occurring, synthetic, ionic, or nonionic emulsifying agents, such as polyvinyl alcohol and block copolymers of polyethylene oxide and polypropylene oxide. The concentration of emulsifying agent in the second solvent (the continuous phase) typically ranges from about 0 to 10% (w/v), preferably from about 0 to 5% (w/v).

Emulsification and polymer disposition may be effected using various processes, depending on the miscibility of the desired solvents. For example, when the second solvent is completely miscible with the first solvent, emulsification and polymer deposition proceed spontaneously with gentle mixing at the large interfacial area formed when the first solvent is added to the second solvent (see, e.g U.S. Pat. Nos. 5,118,528 and 5,049,322).

Alternatively, when the first solvent is only partially miscible with the second solvent, or where the second solvent is nonmiscible with the first solvent, higher mixing energies are typically required to form droplets (microparticles) of the desired size. Moreover, polymer deposition at the interface of the second solvent and the first solvent may be effected in the case of partially miscible solvents by adding a sufficient quantity of second solvent to completely solubilize the first solvent. In the case of immiscible solvents (i.e. incapable of mixing or attaining homogeneity), physical means, such as vacuum distillation, may be used to remove the first solvent from the emulsion and cause polymer deposition (see, e.g. U.S. Pat. No. 4,177,177).

Accordingly, using the foregoing techniques and components, microparticles which encapsulate water-soluble compounds dissolved in a microemulsion are formed. The microparticles have the advantage of being small in size, for example, ranging from approximately 50 nm to 5 μm, more typically from about 200 nm to 600 nm, yet retain high drug load efficiencies of approximately 80%, and more typically 90% or greater. However, the emulsification conditions employed in the invention may be adjusted in manners well known to those of ordinary skill in the art to increase particle size in any range up to, for example, 1000 μm while retaining high encapsulation efficiencies.

Other features, advantages and embodiments of the invention will be apparent from the following examples which are meant to be illustrative and, therefore, not limiting in any way.

EXAMPLES

A. Example 1

Encapsulation of a Water-Soluble Dye Dissolved in a Microemulsion System.

A water/oil microemulsion was prepared as follows: 1.0 ml isopropyl myristate was added to 1.4 ml of a surfactant mixture consisting of polyoxyethylene sorbitan monooleate (Tween 80): sorbitan monolaurate (Span 20): ethanol in a 45:30:25 volume ratio. Next, 0.6 ml of a 6% (w/v) eosin Y solution was added and the mixture briefly vortexed until an optically clear, single phase solution resulted (it was confirmed that eosin was not soluble in the oil or the ethyl acetate prior to formulation of the microemulsion nanocapsules).

Next, 1.0 ml of the microemulsion was dispersed into 10 ml of water-saturated ethyl acetate containing 250 mg poly (lactide-co-glycolide) in a 50:50 mole ratio (PLGA 5050 DL2 low, Medisorb, Cincinnati, Ohio) by using a Powergen 125 laboratory homogenizer (Fisher Scientific, Pittsburgh, Pa.) at low speed. The mixture was then homogenized for two minutes followed by the addition of 20 ml of ethyl acetate-saturated water containing 1% (w/v) polyvinyl alcohol. The mixture was further homogenized for an additional 5 min. to form a coarse oil/water emulsion. This emulsion was poured slowly into 200 ml of distilled water while stirring with a magnetic stir bar. Stirring was continued overnight at room temperature and ambient pressure to allow evaporation of the organic solvent. Unencapsulated eosin was spectrophotometrically measured in the filtrate after filtering the nanoparticle suspension through a 0.02 micrometer pore diameter membrane (Whatman Anodisk).

The resulting nanoparticles were found to contain 89.2% of the initial eosin, which represents a 2.9% eosin content by weight. Scanning electron micrographs indicated that the particles ranged from 200 to 600 nm in diameter (FIG. 1).

B. Example 2
Variation of Example 1

A water/oil microemulsion was prepared by adding 0.5 ml hexadecane to a surfactant mixture consisting of polyoxyethylene sorbitan monooleate (Tween 80): sorbitan monolaurate (Span 20): ethanol in a 45:30:25 volume ratio. To that mixture, 0.35 ml of a 6% (w/v) eosin Y solution was added. Eosin was found not to be soluble in hexadecane under these conditions. Nanoparticles were formed and the eosin encapsulation was measured as described in Example 1. The amount of eosin incorporated into nanocapsules was 98% of the initial quantity added. The particle size distribution measured in electron micrographs was similar to that found in Example 1.

C. Example 3
Encapsulation of Heparin into Nanospheres Using Conventional Single Emulsion Techniques For purposes of comparing the drug loading (encapsulation) efficiency of microparticles formed using the microemulsion technique of the present invention (e.g., as described in Examples 4 and 5 below), microparticles formed using prior art techniques (e.g., the technique described in U.S. Pat. No. 5,049,322) were formed as follows. This technique was used to compare drug loading levels with the present invention because the polymer solvent is miscible with water and will allow the admixture of aqueous heparin solutions, whereas other related nanoparticle formation techniques are not compatible with the incorporation of aqueous drug solutions.

A solution was prepared containing 12,110 USP units of heparin in 0.5 ml distilled water. This solution was admixed with a polymer solution consisting of 120 mg poly(lactide-co-glycolide) 50:50 mole ratio (Medisorb PLGA 5050 DL low), 15.0 ml acetone, 0.5 ml methylene chloride, and 1.0 ml water. The mixture formed a clear, single phase. The solution was poured into 50 ml of water containing 250 mg polyvinyl alcohol with moderate stirring (magnetic stir bar rotating at approximately 100 rpm). A bluish opalescent suspension immediately formed. The suspension was stirred overnight at ambient temperature and pressure to allow the organic solvents to evaporate.

A portion of the suspension was next separated from the surrounding liquid by filtration through a 0.02 micrometer pore membrane. The solids were washed with distilled water and solubilized with dimethyl sulfoxide (DMSO). The DMSO solution was diluted with a solution of 0.1% sodium dodecyl sulfate (SDS) in 50 mM aqueous sodium hydroxide. Aliquots were assayed for heparin activity using the anti-factor Xa enzyme assay (Sigma). Encapsulation efficiency was determined by comparing the heparin content of the washed nanoparticle suspension to the heparin content of an equivalent volume of the unfractionated suspension that was solubilized with DMSO and diluted with the alkaline SDS solution. The encapsulation efficiency was calculated to be the ratio between the heparin content of the washed nanoparticles and the whole suspension, and was found to be 0.5%. Heparin content was 0.01% by weight.

D. Example 4
Encapsulation of a Microemulsion Containing Heparin

A water/oil microemulsion was prepared by adding 2.5 ml isopropyl myristate to 3.65 ml of a surfactant mixture consisting of polyoxyethylene sorbitan monooleate (Tween 80): sorbitan monolaurate (Span 20): ethanol in a 45:30:25 volume ratio. The oil and surfactant were blended together using a laboratory benchtop vortexer. Water, 1.45 ml, containing 25,000 USP units of heparin was subsequently mixed with the oil/surfactant blend by brief vortexing to form the microemulsion.

A 1.0 ml aliquot of the microemulsion containing heparin was then added to 10.0 ml of water-saturated ethyl acetate containing 250 mg poly(lactide-co-glycolide) in a 50:50 mole ratio (PLGA 5050 (Medisorb, Cincinnati, Ohio)). The mixture was homogenized for ninety seconds, added to 20 ml of ethyl acetate-saturated water containing 5% (w/v) polyvinyl alcohol and then further homogenized for 5 min. until a coarse oil/water emulsion formed. This emulsion was next poured slowly into 200 ml of distilled water while stirring with a magnetic stir bar. Stirring was allowed to continue overnight at room temperature and ambient pressure to facilitate evaporation of the organic solvent.

The following morning, a 10 ml aliquot of the nanoparticle suspension was added to a dialysis bag composed of cellulose ester with a nominal molecular weight cutoff of 300 kD. The bag was dialyzed to equilibrium against distilled water. Heparin activity in the water was measured using a commercial anti-factor Xa enzyme assay (Sigma, St. Louis, Mo.). The quantity of heparin measured in the dialysate represented 0.1% of the total quantity of heparin added, thus providing an encapsulation efficiency of 99.9%. Heparin loading was 1.7% by weight.

Accordingly, the results showed that the heparin content of nanoparticles made using the microemulsion encapsulation technique was 170-fold higher than that of matrix-type nanoparticles made using the spontaneous emulsification method detailed in Example 3.

E. Example 5
Variation of Example 4

A water/oil microemulsion was prepared by adding 1.5 ml ethyl oleate to 2.625 ml of a surfactant mixture consisting of polyoxyethylene sorbitan monooleate (Tween 80): sorbitan monolaurate (Span 20): ethanol in a 45:30:25 volume ratio. The oil and surfactant were blended together using a laboratory benchtop vortexer. Water, 0.975 ml, containing 16,870 USP units of heparin was subsequently mixed with the oil/surfactant blend by brief vortexing to form the microemulsion.

A 1.0 ml aliquot of the microemulsion containing heparin was added to 10.0 ml of water-saturated ethyl acetate containing 250 mg poly(lactide-co-glycolide) in a 50:50 mole ratio (PLGA 5050 (Medisorb, Cincinnati, Ohio)). The mixture was homogenized for ninety seconds, then added to 20 ml of ethyl acetate-saturated water containing 1% (w/v) poloxamer 188 (Pluronic F68) and further homogenized for 5 min. forming a coarse oil/water emulsion. This emulsion was poured slowly into 200 ml of distilled water while stirring with a magnetic stir bar. Stirring was allowed to continue overnight at room temperature and ambient pressure to facilitate the evaporation of the organic solvent. Heparin encapsulation was measured by the dialysis method described in example 3. The encapsulation efficiency was 91% and the heparin loading was 2.6% by weight.

F. Example 6
In Vitro Release of Heparin from Nanoparticles Containing Microemulsion A microemulsion was produced consisting of 2.5 ml isopropyl myristate, 4.7 ml of a Tween 80:Span 20:Ethanol (45:20:35) surfactant mixture, and 1.75 ml water containing 300 mg heparin. Next, a 1.5 ml aliquot of this microemulsion was dispersed into 15 ml ethyl acetate containing 375 mg PLGA (50:50 L:G, mw 17,000 Daltons, Medisorb, Cincinnati, Ohio) using a liquid shear homogenizer for 1.5 min. While continuing homogenization, the dispersion was slowly poured into 30 ml aqueous 1% (w/v) polyvinyl alcohol which had been presaturated with ethyl acetate. Homogenization was continued for an additional five minutes before pouring the resulting emulsion into 200 ml of distilled water while stirring with a magnetic bar. Stirring was continued overnight to allow evaporation of the organic solvent before the removal of unencapsulated heparin from the nanoparticles by gel filtration. A quantity of mannitol, 2.5 g, was added to the cleaned nanoparticle suspension prior to freeze-drying to facilitate handling of the dried particles.

Approximately one gram of the dried nanoparticle formulation was added to 100 ml phosphate buffered saline containing 25% ethanol, covered, and incubated at 37° C. One ml of the particle suspension was removed at prescribed intervals and centrifuged at 20,000× g for 30 min. Supernatants were collected and the heparin content was measured using a commercial anti factor Xa calorimetric assay. The in vitro release profile is shown in FIG. 2.

G. Example 7
In Vivo Release of Heparin from Nanoparticles Containing Microemulsion A microemulsion was produced consisting of 1.8 ml isopropyl myristate, 2.7 ml of a Tween 80:Span 20:Ethanol (45:30:25) surfactant mixture, and 0.9 ml water containing 135 mg heparin. One ml of this microemulsion was dispersed into 10 ml of a 2.5% (w/v) PLGA solution in water-saturated ethyl acetate. The dispersion was mixed using a liquid shear homogenizer for 1.5 min. Next, the dispersion was slowly poured into 20 ml ethyl acetate-saturated water containing 0.1% (w/v) polyvinyl alcohol, and homogenized under the same conditions for an additional 5 minutes. An additional 170 ml of distilled water was slowly poured into the emulsion. The vessel was stirred on a magnetic stir plate at room temperature overnight to allow evaporation of the organic solvent.

After evaporation, an aliquot of the suspension was filtered through a 0.02 micron filter, and the heparin content of the filtrate was measured using a calorimetric anti-factor Xa enzyme assay. Encapsulated heparin was found to be 94% of the total amount of drug added at the beginning of the encapsulation process. The formulation was freeze-dried and resuspended in a small volume of water to a concentration of 812 Units heparin per ml, and injected subcutaneously into male Sprague Dawley rats weighing approximately 300 grams. One ml of blood was drawn from the tail vein prior to nanocapsule injection and at intervals thereafter. Plasma was separated and assayed for heparin content using a colorimetric anti factor Xa enzyme assay. Table I shows heparin blood levels in Units/ml plasma at each time point.

Table I Heparin Concentration in Rat Plasma After Subcutaneous Injection.

TABLE I

Heparin concentration in rat plasma after subcutaneous injection.

| Animal | Time (hours) | | | |
|---|---|---|---|---|
| | 0 | 24 | 48 | 72 |
| 1 | 0.06 | 0.08 | 0.15 | 0.09 |
| 2 | 0.08 | 0.09 | 0.12 | 0.1 |
| 3 | 0.07 | 0.07 | 0.12 | 0.05 |
| Mean | 0.07 | 0.08 | 0.13 | 0.08 |
| SD | 0.01 | 0.01 | 0.02 | 0.02 |

The increase in plasma heparin noted at 48 hours post injection is significant at $P \geq 0.05$.

The increase in plasma heparin noted at 48 hours post injection is significant at $P \geq 0.05$.

Equivalents

Those skilled in the art will recognize, or be able to ascertain using no more than routine experimentation, many equivalents to the specific embodiments of the invention described herein. Such equivalents are intended to be encompassed by the following claims. In addition, the entire contents of all patents and publications cited herein are hereby incorporated by reference.

I claim:

1. A method for encapsulating a water-soluble agent comprising:
   (a) forming a microemulsion containing the agent;
   (b) adding the microemulsion to a first solvent comprising one or more polymers, thereby forming a dispersion;
   (c) adding the dispersion to a second solvent which is a nonsolvent for one or more polymers;
   wherein following step (c), the microemulsion is encapsulated by the one or more polymers in the form of microparticles.

2. The method of claim 1, wherein the first solvent is completely miscible with the second solvent.

3. The method of claim 1, wherein the first solvent is partially miscible with the second solvent.

4. The method of claim 1, wherein the agent is a water-soluble drug.

5. The method of claim 1, wherein the microemulsion comprises about 10% to 60% oil by volume.

6. The method of claim 1, wherein the microemulsion further comprises a surfactant.

7. The method of claim 6, wherein the surfactant is selected from the group consisting of polyoxyethylene sorbitan monoleate alone, sorbitan monolaurate, and mixtures thereof.

8. The method of claim 7, wherein the microemulsion comprises about 0.1% and 60% surfactant by volume.

9. The method of claim 1, wherein the microemulsion further comprises a co-surfactant.

10. The method of claim 1, wherein the polymer is selected from the group consisting of polyvinyl alcohols, polyvinyl ethers, polyamides, polyvinyl esters, polyvinylpyrrolidone, polyglycolides, polyurethanes, alkyl celluloses, cellulose esters, hydroxypropyl derivatives of celluloses and cellulose esters, preformed polymers of poly alkyl acrylates, polyethylene, polystyrene, polyactic acid, polyglycolic acid, poly(lactide-co-glycolide), polycaprolactones, polybutyric acids, polyvaleric acid and copolymers thereof, alginates, chitosans, gelatin, albumin, zein and combinations thereof.

11. The method of claim 10, wherein the polymer is poly(lactide-co-glycolide).

12. The method of claim 1, wherein the polymer has a molecular weight in the range of 1000 daltons to 150,000 daltons.

13. The method of claim 12, wherein the polymer has a molecular weight in the range of 3000 daltons to 150,000 daltons.

14. The method of claim 1, wherein the polymer is present at a concentration of about 0.01% to 30% (w/w).

15. The method of claim 14, wherein the polymer is present at a concentration of about 0.01% to 10% (w/w).

16. The method of claim 1, wherein the first solvent is an organic solvent.

17. The method of claim 1, wherein the first solvent is selected from the group consisting of ethyl acetate, benzyl alcohol, and propylene carbonate.

18. The method of claim 1, wherein the second solvent is water.

19. The method of claim 1, further comprising the step of adding a second solvent prior to the addition of the dispersion.

20. A microparticle composition prepared by the process of claim 1.

21. A microparticle composition comprising a microemulsion containing a water-soluble agent and one or more polymers.

22. The composition of claim 21, wherein the polymer encapsulates the microemulsion.

23. The composition of claim 21, wherein the agent is a water-soluble drug.

24. The composition of claim 21, wherein the microemulsion comprises about 10% to 60% oil by volume.

25. The composition of claim 21, wherein the microemulsion further comprises a surfactant.

26. The composition of claim 25, wherein the surfactant is selected from the group consisting of polyoxyethylene sorbitan monoleate alone, sorbitan monolaurate, and mixtures thereof.

27. The composition of claim 26, wherein the microemulsion comprises about 0.1% and 60% surfactant by volume.

28. The composition of claim 21, wherein the microemulsion further comprises a co-surfactant.

29. The composition of claim 21, wherein the polymer is selected from the group consisting of polyvinyl alcohols, polyvinyl ethers, polyamides, polyvinyl esters, polyvinylpyrrolidone, polyglycolides, polyurethanes, alkyl celluloses, cellulose esters, hydroxypropyl derivatives of celluloses and cellulose esters, preformed polymers of poly alkyl acrylates, polyethylene, polystyrene, polyactic acid, polyglycolic acid, poly(lactide-co-glycolide), polycaprolactones, polybutyric acids, polyvaleric acid and copolymers thereof, alginates, chitosans, gelatin, albumin, zein and combinations thereof.

30. The composition of claim 29, wherein the polymer is poly(lactide-co-glycolide).

31. The composition of claim 21, wherein the polymer has a molecular weight in the range of 1000 daltons to 150,000 daltons.

32. The composition of claim 31, wherein the polymer has a molecular weight in the range of 3000 daltons to 150,000 daltons.

33. The composition of claim 21, wherein the polymer is present at a concentration of about 0.01% to 30% (w/w).

34. The composition of claim 33, wherein the polymer is present at a concentration of about 0.1% to 10% (w/w).

* * * * *